United States Patent [19]

Kaneda et al.

[11] Patent Number: 4,685,581
[45] Date of Patent: Aug. 11, 1987

[54] AIR- AND DUST-PROOF COVER FOR FLUSH MOUNTING WIRING FIXTURE

[75] Inventors: Hiroshi Kaneda, Hisai; Mitsuhiro Takagi, Tsu; Masaaki Nakamura, Ichishi, all of Japan

[73] Assignee: Matsushita Electric Works, Ltd., Osaka, Japan

[21] Appl. No.: 1,833

[22] Filed: Jan. 9, 1987

[30] Foreign Application Priority Data

Jan. 25, 1986 [JP] Japan .................................. 61-14318
Jul. 25, 1986 [JP] Japan ................................. 61-176206

[51] Int. Cl.$^4$ ............................................. H02G 3/08
[52] U.S. Cl. ..................... 220/3.2; 220/3.3; 220/3.9
[58] Field of Search ............... 220/3.2, 3.3, 3.5, 3.9; 52/220, 221; 174/53; 339/122 R, 125 R

[56] References Cited

U.S. PATENT DOCUMENTS

| 3,917,101 | 11/1975 | Ware | 220/3.5 X |
| 4,134,636 | 1/1979 | Kleinatland et al. | 220/3.9 X |
| 4,265,365 | 5/1981 | Boteler | 220/3.3 |
| 4,296,870 | 10/1981 | Balkwill et al. | 220/3.3 |
| 4,345,693 | 8/1982 | Balkwill et al. | 220/3.3 |
| 4,389,535 | 6/1983 | Slater et al. | 220/3.2 X |
| 4,408,695 | 10/1983 | Balkwill et al. | . |
| 4,408,696 | 10/1983 | Crosson | 220/3.9 X |
| 4,580,689 | 4/1986 | Slater | 220/3.5 X |

FOREIGN PATENT DOCUMENTS 180411 9/1985 Japan .

Primary Examiner—Steven M. Pollard
Attorney, Agent, or Firm—Burns, Doane, Swecker & Mathis

[57] ABSTRACT

An air- and dust-proof cover for a flush mounting wiring fixture comprises a housing part having cylindrical parts respectively extended inward and outward from the housing part and having therein a flexible thin-wall portion for penetrating therethrough connecting wires to be connected to terminals of the wiring fixture to be housed in the housing part, the wires being thus passed through the flexible thin-wall portion broken by the wires as guided by the cylindrical parts, with any possibility of cracking of the housing part at such wire passing portion or of deterioration of the airtightness due to contraction of the housing part accompanying ambient temperature change effectively eliminated.

5 Claims, 10 Drawing Figures

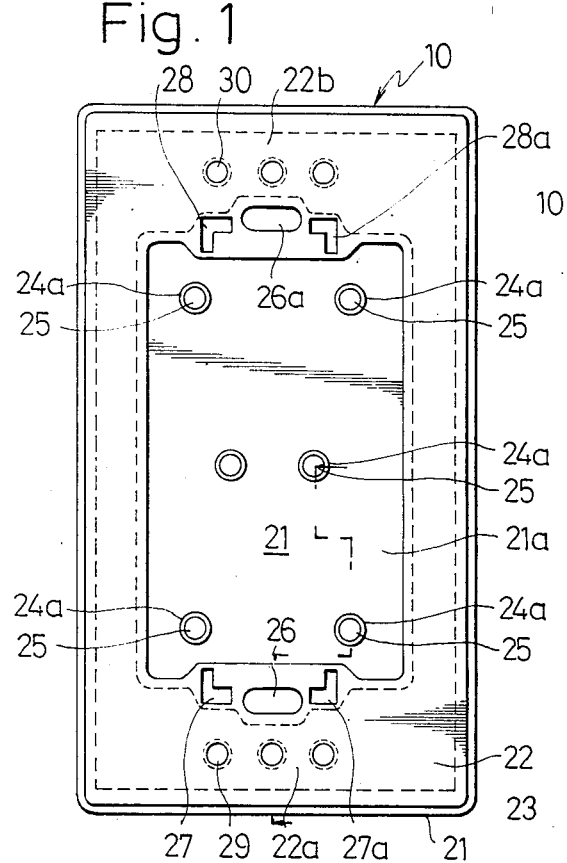
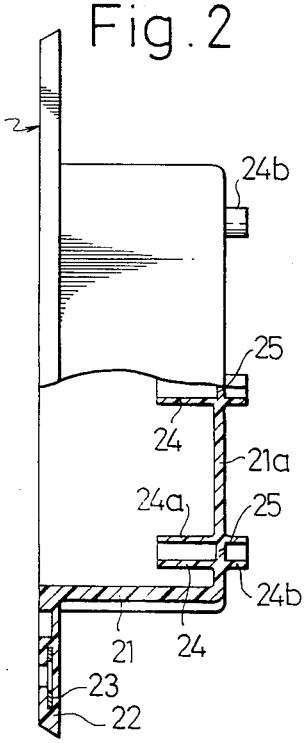
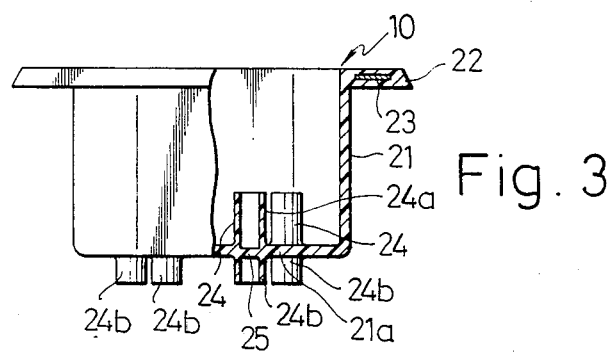

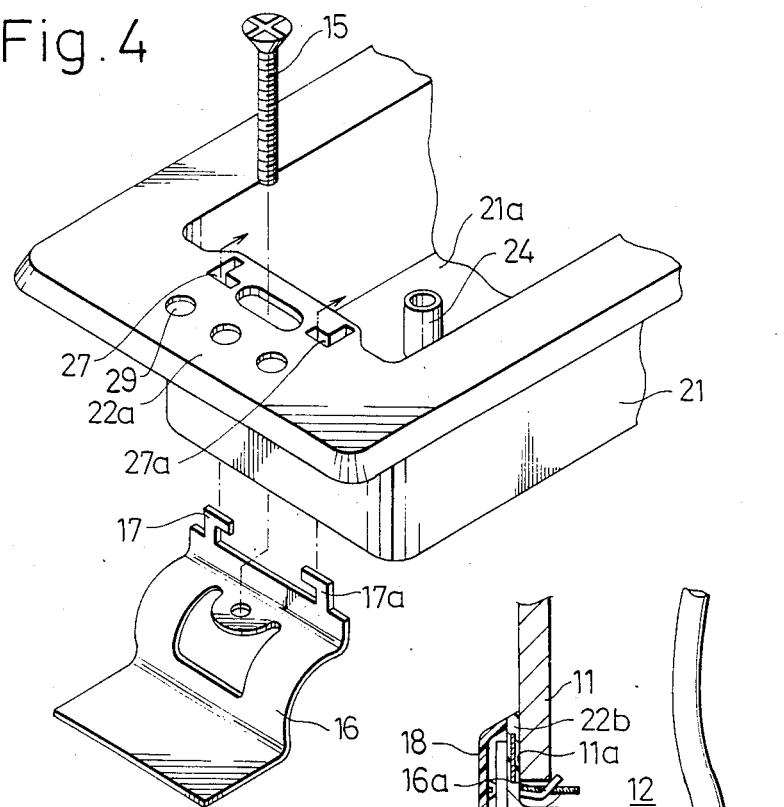
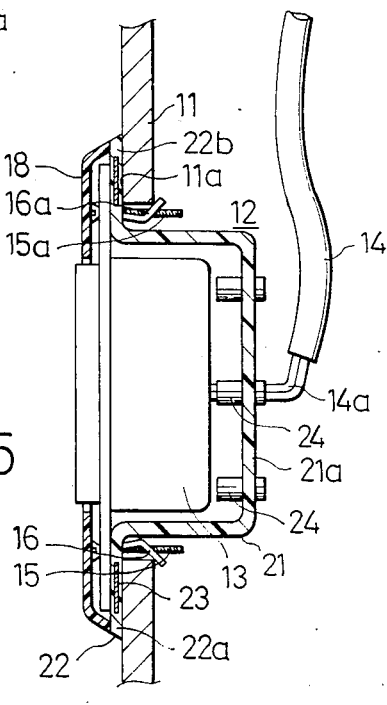

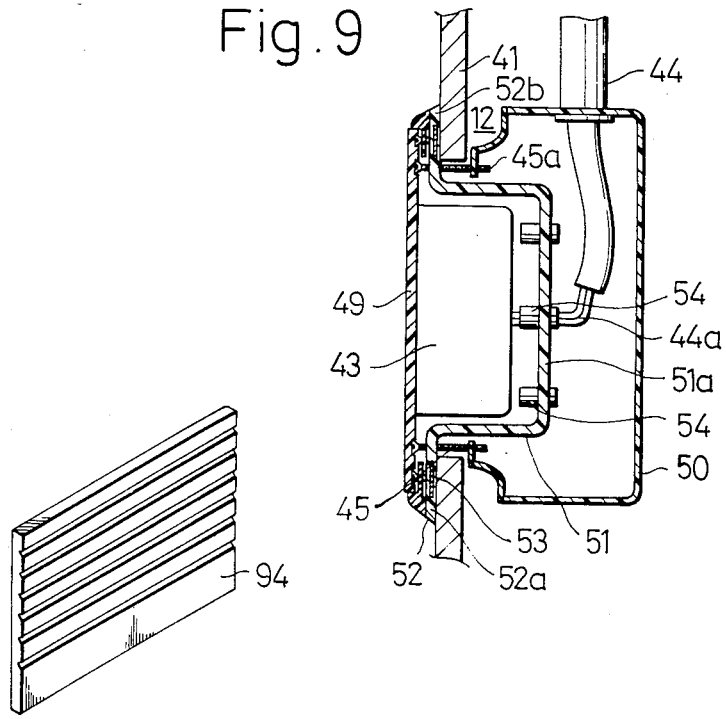
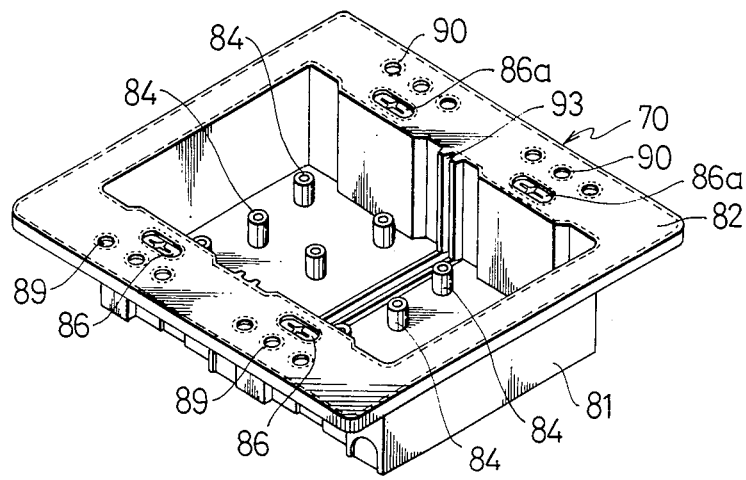

AIR- AND DUST-PROOF COVER FOR FLUSH MOUNTING WIRING FIXTURE

TECHNICAL BACKGROUND OF THE INVENTION

This invention relates to a cover which prevents air and dust from entering a flush mounting wiring fixture.

In general, where the flush mounting wiring fixture is installed in a recess made in a building wall or the like structural member, there often exists an opening or clearance left around the wiring fixture, and it is likely that, in a season involving, for example, a large temperature difference between the interior and exterior of a room, ambient air of a relatively low temperature comes through such clearance into the wiring fixture of a relatively high atmospheric temperature so as to cause water condensed as droplets on electrically conductive parts within the wiring fixture, and such entry of ambient air is accompanied with dust which also entering the fixture. With a provision of an air-and dust-proof cover which encloses the flush mounting wiring fixture, therefore, the ambient air and dust can be prevented from entering the fixture and the water condensation and dust stain within the fixture can be eventually prevented from occurring.

DISCLOSURE OF PRIOR ART

As known air- and dust-proof covers of the kind referred to, the ones disclosed in U.S. Pat. Nos. 4,345,693 to G.R. Balkwill et al. and 4,408,695 as a continuation-in-part of the former may be enumerated. In these Balkwill et al. patents, there are suggested air and moisture resistant covers formed in a bottomed box shape with a plastic material, which is opened on top side to house therein a flush mounting wiring fixture to be installed in a structural member. In these instances, the air and moisture resistant cover is secured to the structural member together with the wiring fixture for preventing air and moisture as well as dust from entering the fixture.

When the air and moisture resistant cover of Balkwill et al. is used, interconnection of such electrical wires as VUF cables, VVF cables or the like terminals of the wiring fixture is to be realized by passing the wires through punched holes in the cover and connecting it to the terminals, in which event the material of the cover will clingingly engage about insulation coating of the wires at the punched holes to provide a tight fitting, for preventing the air entry to some extent. However, this cover has such a problem that, once the cover involves any cracking at the punched holes or any thermal contraction due to a change in the ambient temperature, there occurs a small gap between the wires and the cover at the punched holes and the air entry prevention becomes insufficient.

Japanese Patent Application Laid-Open (KOKAI) Publication No. 60-180411 of S. Kimura et al. may also be enumerated as a prior art but substantially of the same technical level as that referred to in the above.

TECHNICAL FIELD OF THE INVENTION

A primary object of the present invention is, therefore, to provide an air-and dust-proof cover which can enclose the wiring fixture flush-mounted in a structural member with a sufficient airtightness, while maintaining the sufficient airtightness also at portions of the cover for passing therethrough the connecting wires to the terminals of the wiring fixture, and thus can prevent any condensation of moisture at electrically conductive parts within the wiring fixture and any entry of dust or foreign matter into the wiring fixture.

According to the present invention, the above object is attained by providing an air- and dust-proof cover for a flush mounting wiring fixture, the cover comprising a housing part for housing therein said wiring fixture and to be accommodated in a recess made in a building structural member with the wiring fixture housed, a flange part extended around the housing part to lie over peripheral edges of the recess of the structural member and having a reinforcing plate embedded therein, and cylindrical parts respectively extruded both inward and outward from the housing part and having therein a flexible thin-wall for penetrating therethrough connecting wires.

According to the air- and dust-proof cover of the present invention arranged as above, the connecting wires are to be connected to terminals of the wiring fixture housed in the housing part by guiding a connecting and of the respective wires into each of the cylindrical parts, breaking the thin-wall in the cylindrical part with tip end of the wire and passing the wire through the cylindrical part up to one of the terminals, whereby the cover can be prevented substantially from cracking at the wire passing portion and from being affected by a contraction due to any ambient temperature change, and the cover can be provided reliably with a high airtightness.

Other objects and advantages of the present invention shall be made clear from the following description of the invention detailed with reference to preferred embodiments shown in accompanying drawings.

BRIEF EXPLANATION OF THE DRAWINGS

FIG. 1 is a plan view in an embodiment of an air-and dust-proof cover according to the present invention;

FIG. 2 is a side view of the cover of FIG. 1, with a part of the cover shown in section;

FIG. 3 is an endwise view of the cover of FIG. 1, with a part shown in section;

FIG. 4 is a fragmentary perspective view as magnified of the cover of FIG. 1, shown with a mounting means including a clamp for installation of the cover in a structural member;

FIG. 5 is a cross-sectional view of the cover of FIG. 1 showing a state in which the cover is installed in a recess in the structural member, with a flush mounting wiring fixture housed in and secured to the cover;

FIG. 9 is a cross-sectional view of the cover of FIG. 6, shown in a state in which the cover is installed in a recess in a structural member with a wiring fixture housed in and secured to the cover; and FIG. 10 is a perspective view of still another embodiment of the air- an dust-proof cover according to the present invention, with a separator shown as disassembled.

Figure 6:
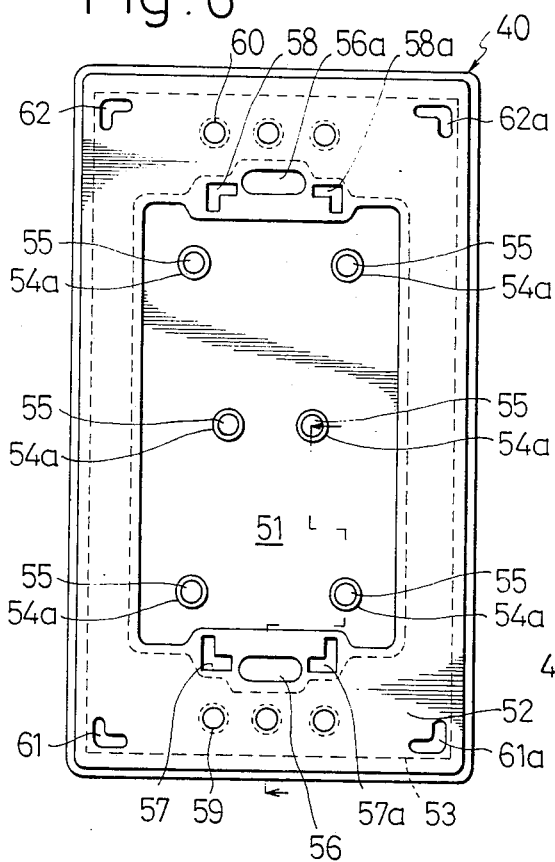
FIG. 6 is a plan view in another embodiment of the air- and dust-proof cover according to the present invention.

While the present invention shall now be described with reference to the preferred embodiments shown in the drawings, it should be understood that the intention is not to limit the invention only to the particular embodiments shown but rather to cover all alterations, modifications and equivalent arrangements possible within the scope of appended claims.

DISCLOSURE OF PREFERRED EMBODIMENTS

Referring to FIGS. 1 to 5, there is shown an air- and dust-proof cover 10 in an embodiment according to the present invention, which is fitted into a recess 12 made in a structural member 11 to accommodate therein a flush mounting wiring fixture 13. More specifically, the cover 10 is made of such a flexible material as a thermoplastic resin, rubber or the like, to have a box-shaped housing part 21 for enclosing therein the flush mounting wiring fixture 13 or, in other words, to have the fixture housed therein. The housing part 21 is formed to have at its opening edge an integral flange part 22 which extends along its entire periphery to be able to lie over peripheral edges 11a of the recess 12 of the structural member 11. Further, a reinforcing member 23 of a metallic material, preferably an iron plate or the like is embedded by insert molding in the flange part 22 along the entire periphery of the housing part 21 to prevent it from being readily deformed. In this connection, the housing part 21 may be made initially separately from the flange part 22 and then be integrally bonded thereto by an adhesive or the like.

The housing part 21 is provided in its bottom wall 21a with a plurality of cylindrical parts 24 which extrude inward and outward at right angles with respect to the bottom wall 21a, at positions corresponding to dispositions of terminals of the wiring fixture 13 to be housed in the housing part 21. A portion 24b of each cylindrical part 24 extruded out of the bottom wall 21a is made to be shorter than the other inward extruded portion 24a of the same cylindrical part while the both portions 24a and 24b are coaxial, and these cylindrical parts 24 are formed respectively to have a thin-wall portion 25 which closes intermediately axial hole of the cylindrical parts preferably with a thickness smaller than other portion of the housing part 21, so that the thin-wall portions 25 will be sufficiently flexible for being readily broken by a leading end 14a of connecting wires 14 provided inside the structural member 11 to pass them through the housing part.

In addition, the flange part 22 is provided in both opposing edge parts 22a and 22b with thin-wall portions 26 and 26a which are located at positions opposed to each other longitudinally through open end of the housing part 21, for penetrating therethrough fastening screws 15 and 15a, and on both sides of the respective thin-wall portions 26 and 26a of the flange part 22 with two pairs of L-shaped thin-wall portions 27, 27a and 28, 28a for penetrating therethrough respective hook portions 17 and 17a of a clamp 16 for securing the flange part 22 to the peripheral edges of the recess 12 of the structural member 11. Two sets of thin-wall portions 29 and 30 may be further provided in the vicinity of the thin-wall portions 26 and 26a of the flange part 22 for allowing set screws (not shown) to be passed therethrough when a decorative cover plate 18 of the fixture is to be secured to the flange part 22 as required.

Now, explanation will be made as to the manner in which the air- and dust-proof cover 1 according to the present invention is mounted to the structural member 11 as housed in its recess 12 together with the wiring fixture 13. First, the connecting ends 14a of the wires 14 of power supply wiring inside the member 11 are inserted respectively into each of the extruded portions 24b of the cylindrical parts 24 outside the bottom wall 21a, urged against the thin-wall portion 25 to break it, and led through the inward protruded portion 24a of the respective cylindrical parts 24 into the interior of the housing part 21. In this case, the flexible thin-wall portion 25 broken by the connecting ends 14a of the wires 14 engages the periphery of the wires resiliently so as to prevent air from passing through the broken thin-wall portion 25. When the full length of the cylindrical parts 24 is made long enough, the interior of these cylindrical parts 24 can be maintained substantially in a solid state with the wires disposed therein, the air-entry prevention can be achieved in this respect, too, and the cylindrical parts 24 can maintain the high non-ventilation property. In addition, the outward protruded portions 24b of the cylindrical parts 24 made relatively shorter are effective to prevent such disadvantages from occurring that the leading ends 14a of the wires urged into the outward protruded portions 24b to break the thin-wall portions 25 therein may cause them resiliently bowed to entail in a simultaneous bowing of the inward extruded portions 24a and to leave them as bowed even after the mounting, and that the leading ends 14a may hit the inner periphery of the portions 24b to render the wire passing to become troublesome. Accordingly, the wires 14 can be airtightly passed through the housing part 21 as guided substantially at right angles with respect to the bottom wall 21a.

Next, the hook portions 17 and 17a of the clamps 16 and 16a are urged to penetrate through laterally extending leg parts of the L-shaped thin-wall portions 27, 27a and 28, 28a of the flange part 22, and are then shifted into vertically extending parts of these thin-wall portion to be hooked on the upper surface of the flange part 22. Here, threaded holes made in the clamps 16 and 16a are positioned to align with the other thin-wall portions 26 and 26a of the flange part 22, and the clamps 16 and 16a are hung at their outward extended end onto inner side face of the peripheral edges of the recess 12 of the structural member 11. Then, a main body of such wiring fixture 13 as a small switch, electrical outlet or the like is housed in the housing part 21 so that peripherally extended flange of a top plate of the fixture body will be seated on the flange part 22 of the cover 10. The set screws 15 and 15a are driven through the flange of the fixture 13 and the thin-wall portions 26 and 26a of the flange part 22 of the cover 10 into the threaded holes of the clamps 16 and 16a to fasten the fixture 13 against the cover 10, while the flange part 22 of the cover 10 and the flange of the wiring fixture 13 are tightly secured by the clamps 16 and 16a and set screws 15 and 15a to the peripheral edges of the recess 12 of the structural member 11, and therefore the wiring fixture 13 and the cover 10 are fixedly mounted to this structural member. In this case, the airtightness can be achieved at the thin-wall portions 26, 26a, 27, 27a, and 28, 28a, through which the screws 15, 15a and hook portions 17, 17a of the clamps 16 and 16a are passed substantially in the same manner as in the case of the foregoing thin-wall portions 25, because these thin-wall portions broken are to resiliently intimately engage the screws and the hook portions. Moreover, since the flange part 22 of the cover 10 is depressed by the fastening force of the set screws 15 and 15a, the airtightness can be further enhanced between the peripheral edges 11a of the structural member 11 and the top plate of the wiring fixture 13. That is, as a whole, the wiring fixture 13 can be housed at its peripheral side faces and bottom face in a space having a high airtightness, while the top wall of the wiring fixture 13 can be retained also in the airtight state with its own airtight structure as has been well known.

Although the reinforcing plate 23 has been illustrated by dotted lines as not expanded to a zone of the flange part 22 including the thin-wall portions 26, 26a, 27, 27a, 28 and 28a in the foregoing arrangement, the reinforcing plate 23 may be expanded to this zone and holes may be made at positions corresponding to the respective thin-wall portions in the expanded reinforcing plate 23, if required. While the thickness of the respective thin-wall portions should depend on the strength of the connecting ends 14a of the cable 14 and so on, it is made to be, for example, about 1 mm. the peripheral edges of the flange part 22 are formed preferably to be sloped outwardly as illustrated for the purpose of avoiding any deposition thereon of dust. Further, it is possible to mount the decorative cover plate 18 onto the wiring fixture 13 except for an operating surface of the fixture 13, in which event, too, the airtightness may be maintained in such that screws passed through a middle frame (not shown) for mounting the cover plate 18 or directly through the cover 18 are driven to further penetrate through other thin-film portions 29 and 30 provided in the flange part 22, so as to secure the cover plate to the case 10 or fixture 13 in any known manner. In addition, the airtightness at the respective thin-wall portions through which the screws and the like members penetrate may be improved by applying an adhesive or the like to these portions after fixation of the members.

Figure 7:
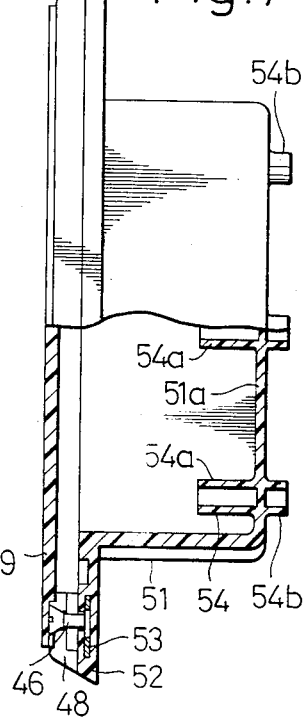
FIG. 7 is a side view of the cover of FIG. 6, with a part of the cover shown in section.
Figure 8:
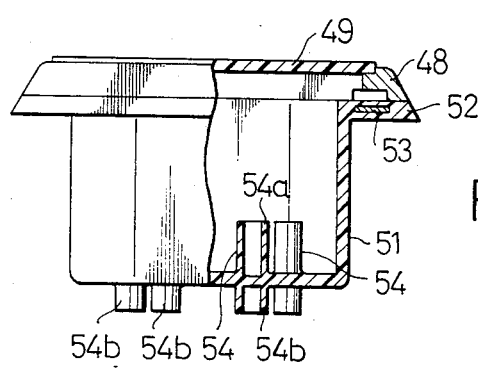
FIG. 8 is an endwise view of the cover of FIG. 6, with a part shown in section.

Referring now to FIGS. 6 to 9 showing an air- and dust-proof cover 40 in another embodiment of the present invention, substantially the same constituent members as those in FIGS. 1 to 5 are denoted by the same reference numerals but added by 30. While the embodiment of FIGS. 1 to 5 is of the cover which is suitable for use in mounting such wiring fixture as the small switch of which operating surface is to be projected, the air- and dust-proof cover 40 of the present embodiment is suitable for use with such a wiring fixture as an electrical outlet 43 having an operating surface not projected and can be covered with a cover plate 49 through a decorative frame 48 when the outlet is not used. In this case, a flange part 52 of the cover 40 is provided at its four corners with L-shaped projections 61, 61a, 62 and 62a which serve to position corresponding corners of the decorative frame 48, so that the decorative frame 48 seated on the flange part 52 through these projections can be mounted on the flange part 52 by means of screws 46 (only one of which is illustrated in FIG. 7) passed through thin-wall portions 59 and 60 provided in the flange part 52. In an event where an embedding box 50 is employed as embedded in a structural member 41 and a housing part 51 of the cover 40 with the wiring fixture 43 housed therein is to be fitted into the embedding box 50, set screws 45 and 45a passed through thin-wall portions 56 and 56a also in the flange part 52 are fastened into corresponding threaded holes in the embedding box 50, and the cover 40 and wiring fixture 43 can be secured to the embedding box 50. It will be appreciated that other arrangement and operation of the present embodiment are substantially the same as those of the foregoing embodiment, and that the wiring fixture 43 is disposed in a highly airtight space of the cover 40.

In FIG. 10, there is shown an air- and dust-proof cover 70 in still another embodiment of the present invention, in which substantially the same constituent members as those of the embodiment shown in FIGS. 1 to 5 are denoted by the same reference numerals but added by 60. In the present embodiment, the air- and dust-proof cover 70 is of a type in which two of the covers of, for example, FIGS. 1 to 5 are jointly arranged, and is provided in middle position of opposing longer, inner side walls and of inner bottom wall with a groove 93 which can fittingly receives a separator 94. it will be understood that this separator an electrically insulatingly separate a housing chamber 81 of the cover 70 into two rooms so that, for example, connecting ends of a low-voltage wire can be connected in one of the rooms while connecting ends of a low-current wire can be connected in the other room and thus different types of the wiring fixtures can be fitted into the single cover 70. Other arrangement and operation of this embodiment are substantially the same as those of the foregoing embodiments, and the different type wiring fixtures can be housed in the cover 70 as electrically isolated from each other and as disposed in a highly airtight space of the cover 70.

What is claimed as our invention is:

1. An air- and dust-proof cover for a flush mounting wiring fixture, comprising a housing part for housing therein said wiring fixture and to be accommodated in a recess made in a building structural member with said wiring fixture housed, a flange part extended around said housing part to lie over peripheral edges of said recess in said structural member and having a reinforcing plate embedded therein, and cylindrical parts respectively extruded both inward and outward from said housing part and having therein a flexible thin-wall portion for penetrating therethrough connecting wires.

2. A cover according to claim 1, wherein said flange part is provided with a first thin-wall portion for penetrating therethrough part of means for coupling the cover to said structural member.

3. A cover according to claim 2, wherein said coupling means is a clamp having at an end a hook forming said part to be penetrated through said first thin-wall portion of said flange part and engnageable at the other end with said peripheral edges of said recess in said structural member, and said flange part is provided with a second thin-wall portion for penetrating therethrough a set screw to be fastened to said clamp for coupling thereto said cover.

4. A cover according to claim 2, wherein said coupling means is an embedding box to be fixed as embedded in said recess of said structural member, and said flange part is provided with a third thin-wall portion for penetrating therethrough a set screw to be fastened to said embedding box for coupling thereto said cover.

5. A cover according to claim 1, wherein said housing part is provided in inner walls with a groove into which a separator is fittingly received for electrically isolatingly separate interior space of the housing part into two rooms.

* * * * *